(No Model.)
F. O. DESCHAMPS.
Car Coupling.
No. 241,629. Patented May 17, 1881.
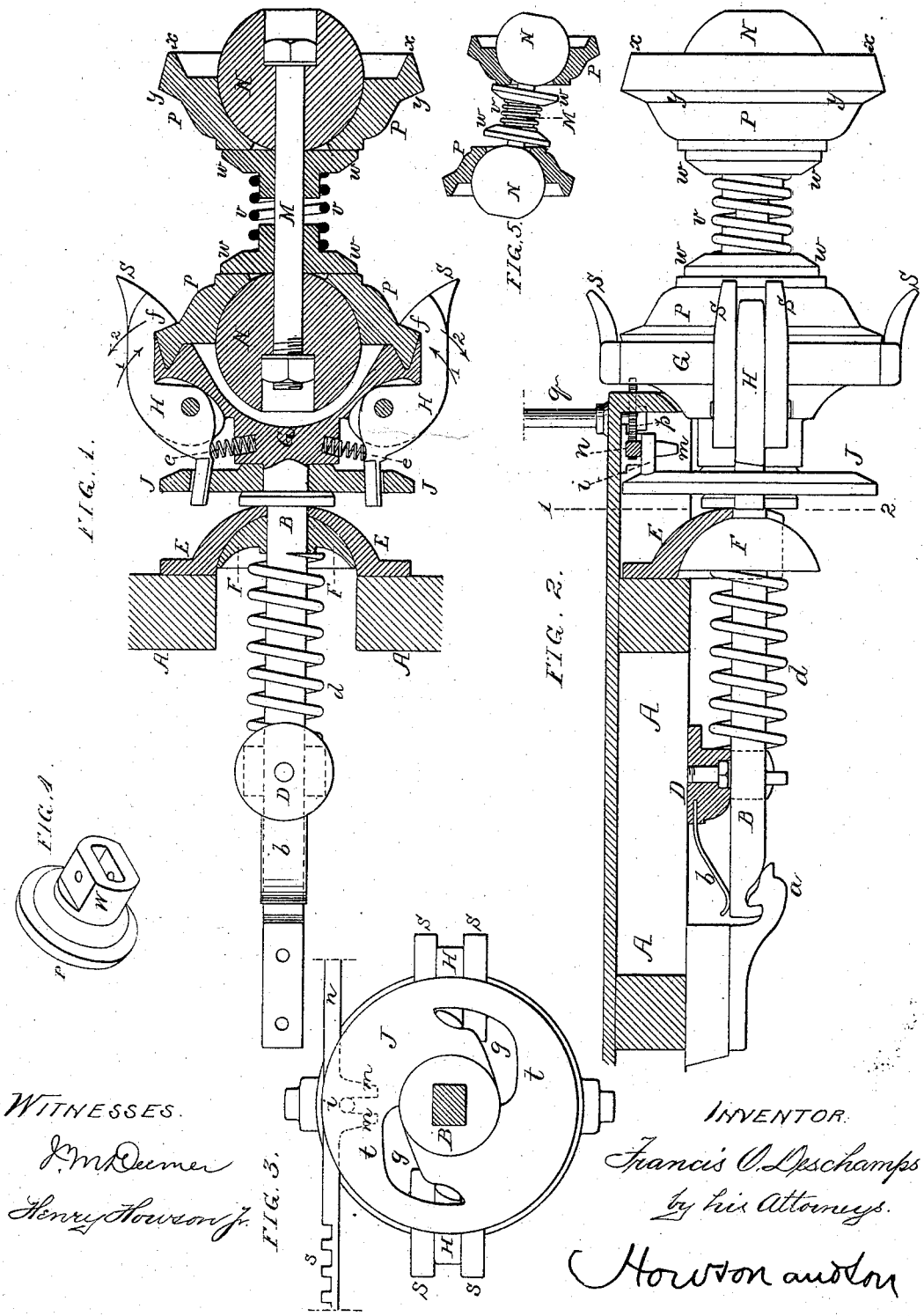
WITNESSES.
INVENTOR.
Francis O. Deschamps
by his Attorneys.
Howson and Son

UNITED STATES PATENT OFFICE.

FRANCIS O. DESCHAMPS, OF PHILADELPHIA, PENNSYLVANIA.

CAR-COUPLING.

SPECIFICATION forming part of Letters Patent No. 241,629, dated May 17, 1881.

Application filed October 4, 1880. (No model.)

*To all whom it may concern:*

Be it known that I, FRANCIS O. DESCHAMPS, a citizen of the United States, residing in Philadelphia, Pennsylvania, have invented certain Improvements in Car-Couplings, of which the following is a specification.

The objects of my invention are to so construct a car-coupling that the cars will be securely coupled without interference with their lateral movement to provide for coupling on a curve, to permit the ready uncoupling of the cars, to enable the coupling to serve as a bumper, and to provide for the automatic separation of one car from another in case of accident.

In the accompanying drawings, Figure 1 is a sectional plan of my improved car-coupling; Fig. 2, a side view, partly in section; Fig. 3, a transverse section on the line 1 2, Fig. 2; Fig. 4, a detached view of a modified form of coupling-block, and Fig. 5 a view of part of the coupler on a reduced scale.

A represents part of the frame of a car-platform, on the under side of which is a projecting hook, a, to which is adapted the hooked inner end of a coupling-bar, B, the proper engagement of the hooks being insured by a spring, b, which, however, does not prevent the vertical disengagement of the hooks if sufficient force is exerted. The coupling-bar B is adapted to slots in, and is retained in position laterally by, a block, D, and socket E secured to the frame A. The socket E is made in the form of a segment of a sphere, and is adapted for the reception of the semi-spherical block F, which is adapted to the coupling-bar B, but is free to slide longitudinally thereon under control of a spring, d, the tendency of which is to press the block F firmly into the socket E, and thereby retain the coupling-bar in its proper vertical position under ordinary circumstances, any undue downward pull or pressure on the bar, however, causing the spring d to yield so as to permit the block F to slide inwardly on the bar and escape from the socket E. The same movement effects the uncoupling of the hooked end of the bar from the hook a, and thus permits the detaching of the coupling-bar from the car.

The outer end of the bar B is provided with a coupling-head, G, to lugs on opposite sides of which are pivoted levers H, which are acted upon by springs e, the tendency of the latter being to move the levers in the direction of the arrows 1, Fig. 1. The long arms of the levers have hooked ends f, and the short arms of said levers are adapted to slots g in a disk, J, hung to a rounded portion of the bar B, and having near the periphery a pin, i, which is embraced by fingers m on a bar, n, the reciprocation of the latter so as to cause the partial rotation of the disk being effected by means of a pinion, p, carried by a vertical shaft, q, and adapted to a rack, s, on the bar n. The slots g of the disk J are so formed that when the short arms of the levers H occupy positions in the outer ends of the slots, as shown in Fig. 3, the hooked ends f of the long arms of the levers will be forced inward and retained in this position, as shown in Fig. 1; but when the disk J is turned so that the short arms of the levers H occupy positions in the enlarged central portions of said slots the levers will be at liberty to move in the direction of the arrows 2, so as to permit the separation of the hooks f by force applied to said hooks, and when the disk J is turned so that the short arms of the levers H occupy positions in the inner ends of the slots g the eccentric portions t of said slots will have so acted upon the short arms of the levers as to effect the separation of the hooks f.

The coupling of the head G on one car to that on another car is effected by means of a device comprising a bolt, M, having at each end a ball, N, adapted to a socket in a ring, P, the rings being kept in contact with the balls by the pressure of a spring, v, interposed between said rings and acting on the same through the medium of caps w. Each ring P has an annular rib, x, adapted to a corresponding recess in the coupling-head G, and on each ring is formed an annular shoulder, y, with which the hooked ends f of the long arms of the levers H of the coupling-head engage when the rings are applied to said coupling-heads, as shown in Figs. 1 and 2.

Each of the coupling-heads G is provided with flaring arms S, which serve to direct the rings to their proper positions for engagement with the hooks f of the levers H, the inner edges of said hooks being inclined, so as to provide for the automatic coupling of the ring P to the coupling-head when the levers are free to move—that is to say, when the short arms of the levers occupy the enlarged central portions of the slots $g$ in the disk J. After the hooks $f$ have clutched the ring P the latter may be secured to the coupling-head by turning the disk J until the short arms of the levers H occupy the outer ends of the slots $g$ and the levers are locked in position. When it is desired to release the ring P from the coupling-head the disk J is turned until the eccentric portions $t$ of the slots $g$ act upon the short arms of the levers H and effect the separation of the hooks $f$.

The interposition of the spring $v$ between the independent rings of the coupling device permits said ring to approach each other, and thus serve the purpose of a spring-bumper, and the use of the socketed rings, in combination with the connecting-rod having balls N, provides for the lateral play of the cars, as shown in the diagram, Fig. 5, and permits the coupling of the cars on a curve.

When a car having my improved coupling-head is to be coupled to a car having the ordinary link-and-pin coupling, I use a coupling-block, such as shown in Fig. 4, the said block consisting of a ring, P, adapted to be clutched to the coupling-head G, and having a projection, W, slotted for the reception of a link and perforated for receiving a coupling-pin.

Owing to the automatic unlocking of the coupling-bar B from the car when undue downward pressure is exerted upon said bar, the running of one car from the track will not cause the other cars to be dragged therefrom, the car which leaves the rails being automatically detached from the adjoining cars, owing to the downward strain exerted upon the coupling-bars B of said adjoining cars.

In some cases pivoted arms may be substituted for the levers H, and means of retracting said arms or levers other than the disk J may be adopted. The levers and disk are preferred, however, as being compact and effective.

I claim as my invention—

1. The combination of a car with a coupling-bar hooked thereto, substantially as described, whereby the said coupling-bar will be automatically detached from the car on the undue depression of the same, all substantially as set forth.

2. The combination of the car having a hook, $a$, and socket E, the coupling-bar B, adapted to the hook $a$, the semi-spherical block F, adapted to the socket E, and the spring $d$, for acting on said block, as set forth.

3. The combination of the coupling-head G, having spring arms or levers H, with hooks $f$, and a disk, J, having slots $g$, portions of which form cams $t$, whereby on the rotation of the disk the arms or levers H will be operated, all substantially as set forth.

4. The combination of the coupling-head G, the arms or levers H, having hooks $f$, and the disk J, having slots $g$, portions of which are contracted, whereby the arms or levers H are locked in position, as set forth.

5. The combination of coupling-heads G, each carrying spring arms or levers H, with a coupling device comprising two connected rings, P, each adapted to one of said coupling-heads and its arms or levers, as set forth.

6. The combination of the coupling-head G, having the annular recess, and the retaining arms or levers H, with a coupling device having a ring, P, with annular rib $x$, and shoulder $y$, as specified.

7. The combination, in a coupling device, of the socketed rings P with the connecting-bolt M, having balls N, adapted to the sockets of the rings, as set forth.

8. The combination, in a coupling device, of the two rings P, the interposed spring $v$, and the connecting-bolt M, as specified.

9. The combination of the coupling-head having levers H, the operating-disk J, having a pin, $i$, the bar $n$, with fingers $m$ and rack $s$, and the pinion $p$, as set forth.

In testimony whereof I have signed my name to this specification in the presence of two subscribing witnesses.

FRANCIS O. DESCHAMPS.

Witnesses:
JAMES F. TOBIN,
HARRY SMITH.